United States Patent
Döring

(10) Patent No.: US 8,756,927 B2
(45) Date of Patent: Jun. 24, 2014

(54) METHOD AND DEVICE FOR THE REGENERATION OF A PARTICLE FILTER ARRANGED IN THE EXHAUST GAS TRACT OF AN INTERNAL COMBUSTION ENGINE

(75) Inventor: Andreas Döring, München (DE)

(73) Assignee: MAN Truck & Bus AG, Munich (DE)

( * ) Notice: Subject to any disclaimer, the term of this patent is extended or adjusted under 35 U.S.C. 154(b) by 417 days.

(21) Appl. No.: 12/539,954

(22) Filed: Aug. 12, 2009

(65) Prior Publication Data

US 2010/0037607 A1 Feb. 18, 2010

(30) Foreign Application Priority Data

Aug. 12, 2008 (DE) .................. 10 2008 038 721

(51) Int. Cl.
*F01N 3/00* (2006.01)
*F01D 23/00* (2006.01)
*F01N 1/00* (2006.01)

(52) U.S. Cl.
USPC .................. 60/303; 60/287; 60/299; 60/320; 60/602; 60/324

(58) Field of Classification Search
USPC ........................................... 60/602, 273–324
See application file for complete search history.

(56) References Cited

U.S. PATENT DOCUMENTS

| | | | | |
|---|---|---|---|---|
| 4,404,804 A | * | 9/1983 | Tadokoro et al. | 60/602 |
| 4,449,362 A | * | 5/1984 | Frankenberg et al. | 60/274 |
| 5,233,830 A | * | 8/1993 | Takeshima et al. | 60/278 |
| 5,406,790 A | * | 4/1995 | Hirota et al. | 60/276 |
| 5,675,968 A | * | 10/1997 | Katashiba et al. | 60/276 |
| 5,711,149 A | * | 1/1998 | Araki | 60/278 |
| 5,753,188 A | * | 5/1998 | Shimoda et al. | 422/108 |
| 6,454,047 B1 | * | 9/2002 | Galaitsis | 181/254 |
| 6,696,031 B1 | * | 2/2004 | Twigg et al. | 423/212 |
| 6,915,629 B2 | * | 7/2005 | Szymkowicz | 60/289 |
| 7,367,182 B2 | * | 5/2008 | Takahashi et al. | 60/286 |
| 2004/0139739 A1 | * | 7/2004 | Kagenishi | 60/289 |
| 2005/0086932 A1 | * | 4/2005 | Cheong | 60/295 |
| 2005/0223699 A1 | * | 10/2005 | Ancimer et al. | 60/286 |

(Continued)

FOREIGN PATENT DOCUMENTS

DE 102 0050 552 40 A1 5/2007
EP 03 418 32 A2 4/1989

(Continued)

OTHER PUBLICATIONS

English Translation of KR2005070611A to Kim Y B.*

*Primary Examiner* — Thomas Denion
*Assistant Examiner* — Anthony Ayala Delgado
(74) *Attorney, Agent, or Firm* — Cozen O'Connor

(57) ABSTRACT

A method and to a device for the regeneration of a particle filter arranged in the exhaust gas tract of an internal combustion engine with at least one NO oxidation catalyst for the oxidation of NO, especially to $NO_2$, which is arranged upstream of the particle filter and through which an exhaust gas stream flows. At least one heater, especially a heating catalyst, through which another gas stream, i.e., a second exhaust gas stream, flows and which heats the additional gas steam, is provided upstream of the particle filter. The heated additional gas stream is mixed upstream of the particle filter with the exhaust gas stream coming from the NO oxidation catalyst, i.e., the gas stream loaded in particular with $NO_2$.

15 Claims, 2 Drawing Sheets

(56) References Cited

U.S. PATENT DOCUMENTS

| | | |
|---|---|---|
| 2007/0130921 A1* | 6/2007 | Yezerets et al. ............... 60/295 |
| 2007/0220866 A1* | 9/2007 | Nishiumi ....................... 60/286 |
| 2008/0120966 A1* | 5/2008 | Sugiyama et al. ............. 60/287 |
| 2008/0314021 A1* | 12/2008 | Sisken ........................... 60/274 |
| 2009/0031711 A1* | 2/2009 | Braun et al. ................... 60/297 |

FOREIGN PATENT DOCUMENTS

| | | | |
|---|---|---|---|
| EP | 10 727 65 A2 | | 7/2000 |
| JP | 59-126 017 | | 7/1984 |
| JP | 2004100489 A | * | 4/2004 |
| KR | 2005070611 A | * | 7/2005 |
| WO | WO 2006/000893 | | 1/2006 |
| WO | WO 2008/081153 | | 7/2008 |

\* cited by examiner

METHOD AND DEVICE FOR THE REGENERATION OF A PARTICLE FILTER ARRANGED IN THE EXHAUST GAS TRACT OF AN INTERNAL COMBUSTION ENGINE

BACKGROUND OF THE INVENTION

1. Field of the Invention

The present invention pertains to a method for the regeneration of a particle filter arranged in the exhaust gas tract of an internal combustion engine and to a device for the regeneration of a particle filter arranged in the exhaust gas tract of an internal combustion engine. The invention pertains in particular to a method and to a device for regenerating particle filters in internal combustion engines operating with excess air such as diesel engines and gasoline engines with direct injection like those typically used in motor vehicles or commercial vehicles.

2. Description of the Related Art

To minimize the fine, carbon-containing particles, "particle separators" or particle filters are used in motor vehicles. A typical particle separator arrangement for motor vehicles is known from EP 10 727 65 A2. These particle separators differ from particle filters in that the exhaust gas stream is conducted along the separator structures, whereas, in the case of particle filters, the exhaust gas is forced to flow through the filter medium. As a result of this difference, particle filters tend to clog, which increases the exhaust gas backpressure. Particle filters cause an undesirable increase in the pressure at the exhaust gas outlet of the internal combustion engine, which in turn reduces engine power and leads to an increase in the amount of fuel consumed by the internal combustion engine. An example of a particle filter arrangement is known from EP 03 418 32 A2.

In both of the arrangements above, an oxidation catalyst located upstream of the particle separator or particle filter oxidizes nitrogen monoxide (NO) in the exhaust gas to nitrogen dioxide ($NO_2$) with the help of the residual oxygen ($O_2$) also present in the exhaust gas according to the following equation:

$$2NO+O_2 <-> 2NO_2.$$

At high temperatures, the equilibrium of the above reaction is on the NO side. This means that, as a result of this thermodynamic limitation, the $NO_2$ levels that can be achieved at high temperatures are limited.

In the particle filter, the $NO_2$ reacts with the extremely fine carbon-containing particles to form CO, $CO_2$, $N_2$, and NO. The strong oxidizing agent $NO_2$, has the effect of continuously removing the deposited ultrafine particles, so that the complicated regeneration cycles which must be conducted in the case of other arrangements can be omitted. We speak in this context of a "passive" regeneration according to the following equations:

$$2NO_2+C->2NO+CO_2$$

$$NO_2+C->NO+CO$$

$$2C+2NO_2->N_2+2CO_2$$

In addition to $NO_2$, $SO_3$ is also formed, the latter being produced on the platinum-containing NO oxidation catalysts from the sulfur contained in the fuel and/or motor oil. The $SO_3$ and $NO_2$ condense on cold spots in the exhaust gas tract and form highly corrosive sulfuric acid and nitric acid. Because of the sulfuric and nitric acids, the exhaust gas system must be made of high-grade steel up as far as the particle filters to avoid corrosion.

If all of the carbon deposited in the particle filter cannot be oxidized with the $NO_2$, the carbon content and thus the exhaust gas backpressure increases continuously. To avoid this, more and more particle filters are currently being provided with a catalytic coating for the oxidation of NO as shown in EP 03 418 32 A2. In concrete terms, these are platinum-containing catalysts. The disadvantage of this method is that the $NO_2$ formed on the particle filter can serve to oxidize only the particles which have been separated downstream of the layer catalytically active for NO oxidation, that is, only particles inside the filter medium. If, however, a layer of separated particles—a so-called "filter cake"—forms on the surface of the filter and thus on the catalytically active layer, the NO oxidation catalyst on the particle filter side then lies downstream of the filter cake, so that the soot particles separated cannot be oxidized with the help of $NO_2$ from the NO oxidation catalyst applied to the particle filter. To be precise, only the catalyst layer applied on the raw gas side contributes to the performance of the system, because the $NO_2$ formed catalytically on the clean gas side can no longer come into contact with the soot on the raw gas side or the soot deposited inside the filter material.

Another problem with particle filter coatings is that the geometric surfaces of the filter are much smaller than those of the catalyst substrates normally used. The reason for this is that the filters require relatively large free cross sections and thus free volumes on the raw gas side to allow the deposition of soot and motor oil ash. If ceramic filter substrates are used, this is realized by a low cell density of 50 cells per square inch (cpsi) to 200 cpsi. In contrast, pure catalysts are usually made with cell densities of 400-900 cpsi. Increasing the density from 50 cpsi to 900 cpsi results in an increase in the geometric surface area from 1 $m^2/L$ to 4 $m^2/L$, as a result of which it becomes possible to achieve a considerable increase in the conversions on the catalysts.

For these reasons, even if the filter has been provided with a catalytic coating, it is impossible to dispense with an NO oxidation catalyst upstream of the particle filter, which means that the filter unit becomes relatively bulky. This situation exists even in cases where the NO oxidation catalysts and the particle filters form a single structural unit, in which the inlet area of the particle filter is designed as an NO oxidation catalyst as described, for example, in DE 103 270 30 A1.

Although it is possible through these measures to oxidize soot at temperatures as low as about 250° C., there are nevertheless applications in which exhaust gas temperatures do not reach 250° C. and thus the reliable function of the particle filter can no longer be guaranteed. This normally occurs when engines are operating at low loads and in engines installed in motor vehicles such as passenger cars, route busses, or garbage trucks which comprise long periods of no-load operation. In cases such as these, a second particle filter regeneration is used, in which the exhaust gas temperature is actively increased. This is usually done by the addition of hydrocarbons (HCs) upstream of the catalysts, especially HC oxidation catalysts. As a result of this exothermic reaction or oxidation of the hydrocarbons on the catalysts, a significant increase in temperature is achieved.

If it is possible in this way to increase the temperature beyond 600° C., the carbon deposited in the particle filter is oxidized or burned off with the help of oxygen according to the following equation:

$$C+O_2 -> CO_2.$$

Nevertheless, there is the danger with this so-called "active" filter regeneration that, as a result of the exothermic burning-off of the carbon-containing soot, the temperature can increase sharply to as much as 1,000° C., and thus in most cases there will be damage to the particle filter and/or to the downstream catalysts. Because, furthermore, the increase in temperature must be maintained for several minutes to ensure quantitative oxidation of the soot particles, the amount of hydrocarbons required is not inconsiderable. This lowers the efficiency of the internal combustion engine, because the fuel for the engine is normally used as the source of the hydrocarbons.

A simple combination of these two types of regeneration, according to which hydrocarbons are added upstream of NO oxidation catalysts, does not lead to the goal either.

As a result of the increase in temperature to more than 600° C., hardly any more $NO_2$ is formed on the NO oxidation catalysts because of the thermodynamic limitation. The oxidation of NO is also hindered by the large quantities of hydrocarbons, which results in a considerable decrease in the formation of $NO_2$. This has the result that the particles must be oxidized with the help of oxygen alone, because there is no $NO_2$ available in this phase. This prolongs the regeneration time.

At the same time, the NO oxidation catalysts are more vulnerable to thermal damage than catalysts for hydrocarbon oxidation, because, at temperatures over 550° C., the active components are subject to irreversible sintering, which reduces the NO oxidation activity.

SUMMARY OF THE INVENTION

It is therefore the goal of the present invention to provide a method and a device for the regeneration of a particle filter arranged in the exhaust gas tract of an internal combustion engine to effectively and reliably regenerate particle filters in a simple and compact manner.

According to one embodiment of the invention, at least one heater, formed by at least one heating catalyst, through which an additional gas stream flows and is heated, is provided upstream of the particle filter, wherein this heated additional gas stream is then mixed upstream of the particle filter with an exhaust gas stream, in particular an exhaust gas stream loaded with $NO_2$, coming from an NO oxidation catalyst.

According to one embodiment of the invention, at least one NO oxidation catalyst and at least one heater, preferably a heating catalyst, are installed upstream of the particle filter in parallel with each other in terms of fluid mechanics, so that an exhaust gas stream flows through one of them (the NO oxidation catalyst), and an additional gas stream flows through the other one (the heater). The heated additional gas stream raises the temperature at the particle filter, wherein simultaneously large quantities of $NO_2$ are still available from the NO oxidation catalyst, because there is no increase in temperature in the area of the NO oxidation catalyst which could negatively affect $NO_2$ formation and/or no elevated hydrocarbon concentrations which could lead to a loss of NO oxidation activity. This increase in the temperature of the exhaust gas stream upstream of the particle filter therefore occurs in a separate part of the exhaust gas line, a certain distance away from the NO oxidation catalyst, wherein this heated gas stream is then mixed downstream of the NO oxidation catalyst with the $NO_2$-loaded exhaust gas stream coming from the NO oxidation catalyst thus increasing the exhaust gas temperature of this exhaust gas stream upstream of the particle filter.

According to one embodiment of the invention, a highly functional combination of active and passive particle filter regeneration techniques is made available, a combination which exploits the advantages of two approaches but avoids their negative interactions.

As a result of the high temperatures thus made possible in combination with the support of the oxidation of the soot by the strong oxidizing agent $NO_2$, it is possible to shorten the regeneration time and to lower the regeneration temperature to about 400° C. In this way, the amount of hydrocarbons required to increase the temperature is also decreased, as is the danger of an uncontrollable temperature increase and of the associated thermal damage to the particle filter or downstream catalysts.

The additional gas stream used to realize the temperature elevation is preferably branched from, a charging-air-side fresh-air stream or from a charging-air stream downstream of the entry point of an exhaust gas return line of an external exhaust gas return. It can thus be ensured that sufficient oxygen is available at the heater, preferably designed as an oxidation catalyst. In a preferred embodiment, the additional gas stream is formed by an exhaust gas stream that is branched off from the exhaust gas line of the internal combustion engine, and which thus represents a second exhaust gas stream. The following discussion is based on this embodiment wherein, wherever technically advisable, the second exhaust gas stream in the larger sense can be replaced analogously by or mixed with, for example, a fresh-air stream on the charging air side.

The second exhaust gas stream can be taken from any suitable point of the exhaust gas system and then mixed in the heated state with the first exhaust gas stream. Especially preferred, however, is a design in which the exhaust gas line leading to the NO oxidation catalyst and to the heater is divided into a first branch line, through which the first exhaust gas stream flows and in which the NO oxidation catalyst is arranged, and a second branch line, through which a second exhaust gas stream flows and in which the heater is connected in parallel, in terms of fluid mechanics, to the NO oxidation catalyst. These two branch lines are then brought together again downstream of the NO oxidation catalyst and the heater to form an exhaust gas line leading to the particle filter. In a preferred embodiment, the second branch line is designed as a bypass line, which branches from the exhaust gas line that simultaneously forms the first branch line that leads to the NO oxidation catalyst. A bypass line of this type takes account of the quantity of exhaust gas or the mass flow of exhaust gas which flows through the heater, formed especially by a heating catalyst, which is usually smaller than that of the first exhaust gas stream conducted through the NO oxidation catalyst.

The heater, according to a preferred embodiment, is formed by a heating catalyst, especially by an oxidation catalyst, by which the temperature of the exhaust gas stream is increased by an exothermic reaction or oxidation. The oxidation catalyst is preferably an HC oxidation catalyst, by which hydrocarbons are oxidized and thus release thermal energy. The hydrocarbons are preferably formed by the fuel. In principle, the hydrocarbons are made available by generating high hydrocarbon emissions in the exhaust gas by a late post-injection of fuel into the combustion chamber. The use of a separate metering device, such as an injection nozzle or the like, provided in the exhaust gas line, however, is preferred as a way of supplying the hydrocarbons. This metered addition takes place upstream of the heating catalyst, in that a predetermined amount of hydrocarbons is metered or sprayed into the second exhaust gas stream at predetermined times. It is preferred for the metered addition to be conducted according to predetermined open-loop or closed-loop control parameters, such as a periodically recurring addition, with the help of an electronic control unit.

To ignite the added hydrocarbons, the exhaust gas stream to be heated is conducted over the heater, preferably designed as an HC oxidation catalyst, as a result of which the exhaust gas stream is heated. The heat output is limited by the amount of oxygen present. In the event the lambda value reaches 1, it is no longer possible for any oxidation of the hydrocarbons to occur. To avoid this, fresh air is supplied to the exhaust gas stream to be heated after a certain predetermined temperature is reached and/or after a predetermined time and/or the lambda value or oxygen value falls below a predetermined limit. This optional fresh air feed has the effect of raising the lambda value and thus also of increasing the heat output. In most cases the fresh air is branched off on the charging-air side, fresh air can also be branched off upstream and/or downstream of the entry point of an exhaust gas return line into a charging-air line.

The exhaust gas stream conducted over the NO oxidation catalyst is usually larger than that passing over the heating catalyst. This distribution is achieved by simple technical flow measures, such as by the use of different hydraulic diameters (pipe or tube diameters). Nevertheless, the distribution can also be accomplished actively by at least one variable throttle device and/or shut-off device connected to an open-loop or closed-loop control device that controls the exhaust gas quantity and/or exhaust gas mass of the first and second exhaust gas streams can be specified or automatically controlled in correspondence with preestablished quantitative and/or mass flow parameters. The throttle and/or shut-off device is formed by at least one of, a throttle flap, shut-off flap, a throttle valve, shut-off valve. For example, these throttle and/or shut-off devices are installed in the branching area of the first and second exhaust gas streams and thus upstream of the NO oxidation catalyst or of the heater and/or of the heating catalyst. Especially in conjunction with a type of bypass line in which the heating catalyst or the heater is installed, i.e., a parallel connection of this component with respect to the NO oxidation catalyst, it is effective to install the mechanical means, i.e., the throttle device and/or the shut-off device, in the area of an exhaust gas line carrying the second exhaust gas stream.

This configuration is preferable, especially when the second exhaust gas stream is branched off upstream of an exhaust gas turbocharger. A problem in the case of internal combustion engines with exhaust gas turbochargers operating at low load is that, because of the compression work performed by the turbocharger, the exhaust gas temperatures are even lower than those in the case of internal combustion engines without exhaust gas turbocharging. This can lead to a situation in which the light-off temperature of the heating catalyst, i.e., an HC oxidation catalyst, is not reached, and thus it becomes impossible to inject hydrocarbons. This problem is made even worse when two-stage charging and/or high exhaust gas return rates are used. In this case, one approach to withdraw the exhaust gas stream which is conducted over the heating catalyst, designed, as an HC oxidation catalyst, upstream of the exhaust gas turbine and to feed it back in the inventive manner into the exhaust gas stream downstream of the NO oxidation catalysts. As a result, the heating catalyst, designed as an HC oxidation catalyst, operates on a much higher temperature level, allowing the oxidation of the injected hydrocarbons, even when the problems discussed above are present. Because the efficiency of the charging group is impaired by bleeding-off of pressure by way of the HC oxidation catalyst, a controllable throttle element and/or shut-off element is preferably provided in the exhaust gas stream taken upstream of the turbine. As a result, the partial gas stream can be throttled or shut off completely during operation in non-regeneration mode. If a waste gate is required to protect the turbocharger and/or the internal combustion engine, the partial stream and the throttle or shut-off devices are used simultaneously as a waste gate.

The heater, especially the heating catalyst, is installed outside the exhaust gas system; that is, it is installed so that the exhaust gas does not flow around it. This leads, however, to the relatively rapid cooling of this heater, especially to the cooling of the heating catalyst. It is therefore more advisable to install the heater, especially the heating catalyst, in the exhaust gas tract in such a way that the exhaust gas flows around it, as a result of which the heat losses at the heating catalyst are reduced. An especially space-saving arrangement is to surround or enclose at least parts or at least certain areas of the heater, especially of the heating catalyst, with the NO oxidation catalyst. Installation in a common housing also represents a useful variant.

To further improve the system, the heating catalyst is provided, preferably designed as an HC oxidation catalyst, with NO oxidation activity, as a result of which the amount of $NO_2$ made available during non-regeneration mode is increased and the oxidation of the particles is thus improved by passive regeneration. It thus becomes possible to prolong the intervals between the active temperature increases. It must be kept in mind, however, that the heating catalyst is preferably made with greater thermal stability than the pure NO oxidation catalyst. This usually has the result that the NO oxidation activity of the heating catalyst is lower than that of the pure NO oxidation catalyst, as previously mentioned.

To avoid high hydrocarbon concentrations downstream of the particle filter, especially when HC oxidation catalysts are used as heating catalysts, the filter is provided with a catalyst for the oxidation of hydrocarbons. A catalyst with hydrocarbon oxidation activity attached or installed upstream and/or downstream of the particle filter is also conceivable.

Metals of the platinum metal group are preferably used as the active components for both the NO catalyst and for the HC oxidation catalyst. The compositions of the components for these two catalysts, however, differ: to improve the thermal stability of the HC oxidation catalysts, the percentage of palladium is higher in them than in the NO oxidation catalysts. For the HC oxidation catalysts, it is also possible in principle to consider the use of cerium as an active element.

The activity of the two catalyst types can be increased by the use of zeolites, for example.

Catalysts for $NO_x$ reduction, furthermore, such as, for example, at least one NO storage catalyst and/or at least one SCR catalyst, are provided in the exhaust gas tract or exhaust gas train. The $NO_x$ storage catalysts is installed downstream of the oxidation catalysts and/or downstream of the particle filter. Platinum and/or barium and/or calcium is preferably used as the active component for the $NO_x$ storage catalysts. For the SCR catalysts, however, the use of tungsten-stabilized vanadium pentoxide, preferably on a titanium dioxide base, iron zeolites, copper zeolites, or cobalt zeolites is effective.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below purely by way of example with the help of drawings in which.

DETAILED DESCRIPTION OF THE PRESENTLY PREFERRED EMBODIMENTS

Figure 1:
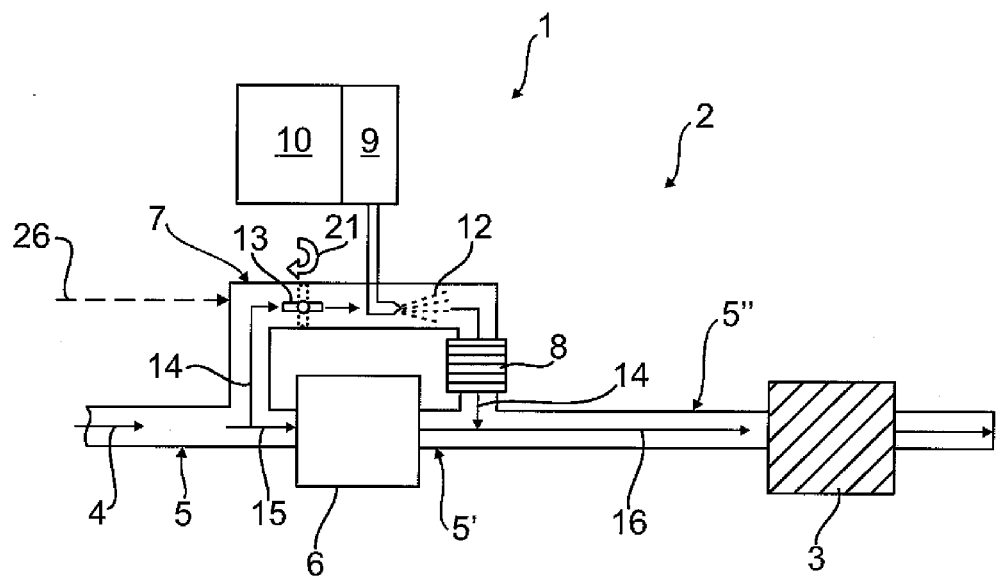
FIG. 1 is a schematic diagram of a device for the regeneration of a particle filter installed in the exhaust gas tract of an internal combustion engine according to a first embodiment of the invention.

FIG. 1 shows schematically, and purely by way of example, an inventive regeneration device 1 for a particle filter 3, installed in the exhaust gas tract or exhaust gas train 2 of an internal combustion engine (not shown).

In concrete terms, the exhaust gas tract 2 comprises here an exhaust gas line 5. Upstream of an NO oxidation catalyst 6, a bypass line 7, in which an HC oxidation catalyst 8 is arranged, branches from the exhaust gas line 5. The NO oxidation catalyst 6 is arranged in the exhaust gas line 5' proceeding from the branching point. Downstream of the HC oxidation catalyst 8 and downstream of the NO oxidation catalyst 6, the bypass line 7 and the exhaust gas line 5' are brought together again to form an exhaust gas line 5", in which the particle filter 3 is arranged.

The regeneration device 1 also comprises a metering device 9 for fuel, shown schematically, connected to at least one of an open-loop and closed-loop control device 10. The metering device 9 comprises an injection nozzle 11 leading into the bypass line 7. By means of this nozzle 11, the fuel 12 is sprayed into the bypass line 7 upstream of the HC oxidation catalyst 8 at predetermined times and in predetermined amounts, preferably periodically, under the open and/or closed-loop control of the control device 10.

As can also be derived from FIG. 1, a throttle flap 13 is arranged upstream of the HC oxidation catalyst 8 in the area of the bypass line 7; this throttle flap 13 is preferably connected to an open-loop and/or closed-loop control device (not shown) Based on the position of the throttle flap 13, the quantity and mass of a second exhaust gas stream 14 branched off into the bypass line 7 from an exhaust gas stream 4 coming from the internal combustion engine can be specified and/or automatically controlled. The maximum open position of the throttle flap 13 is shown by the line in FIG. 1, and the closed position of the throttle flap 13 is shown by the dotted line. The arrow designated "21" is intended to illustrate this variability of the throttle flap. The first exhaust gas stream 15 remaining after the second exhaust gas stream 14 has been branched off then flows through the NO oxidation catalyst, wherein most of the nitrogen monoxide NO of the first exhaust gas stream is oxidized in the NO oxidation catalyst 6 to $NO_2$ at relatively low temperatures, so that a first exhaust gas stream loaded with a large amount of $NO_2$ leaves the NO oxidation catalyst 6. A throttle device and/or shut-off device can also be provided in the first exhaust gas stream 15 to provide the ability to vary the exhaust gas quantities over the two partial streams. For the sake of clarity, however, this device is not shown in FIG. 1.

The second exhaust gas stream 14 takes up the fuel or hydrocarbons sprayed into it along its flow route upstream of the HC oxidation catalyst 8 and enriched fuel flows through the HC oxidation catalyst 8, in which an exothermic reaction or oxidation then takes place, as a result of which the second exhaust gas stream 14 is heated to a predetermined temperature.

This heated second exhaust gas stream 14 is then mixed back into the $NO_2$-loaded first exhaust gas stream 15 downstream of the NO oxidation catalyst 6, so that, after the two exhaust gas streams 14, 15 have been mixed together, a hot exhaust gas stream 16 carrying a large amount of $NO_2$ flows to the particle filter 3, where the carbon-containing soot particles deposited in the particle filter 3 are converted to CO, $CO_2$, $N_2$, and NO, as a result of which the particle filter 3 is regenerated. As shown merely by the dashed line in FIG. 1, a predetermined amount of a fresh air stream 26 from the charging air side can be supplied to the second exhaust gas stream 14, by means of which, during the regeneration phase, the heat output can be increased even more at predetermined times, especially when a lambda value or oxygen value falls below a predetermined limit.

Figure 2:
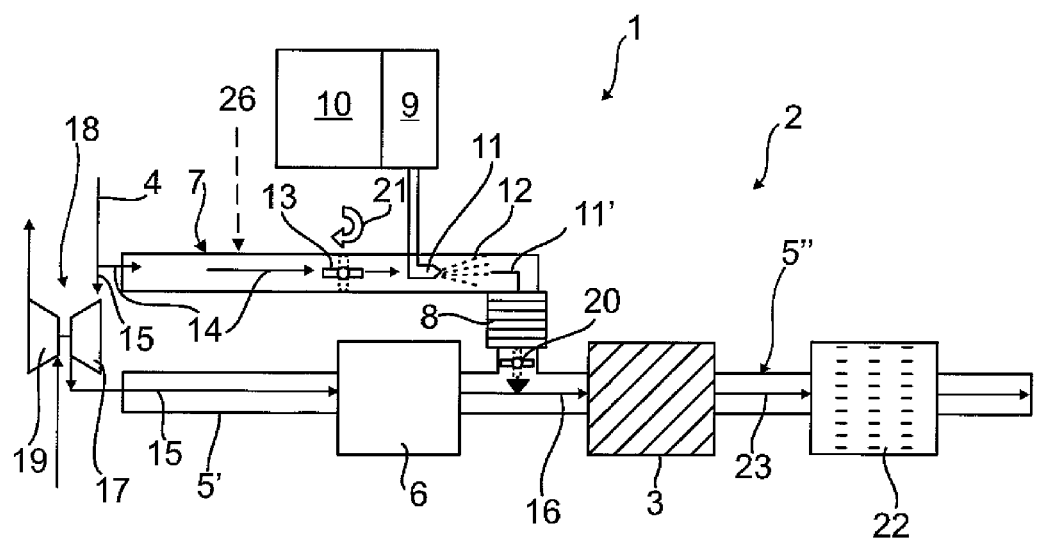
FIG. 2 is a schematic diagram of a device for the regeneration of a particle filter installed in the exhaust gas tract of an internal combustion engine according to a second embodiment.

FIG. 2 is another of regeneration device 1, in which parts which are the same as those of the embodiment according to FIG. 1 are designated by the same reference numbers and are not explained again in detail here to avoid unnecessary repetition. In contrast to the embodiment of FIG. 1, the second exhaust gas stream 14 is withdrawn upstream of an exhaust gas turbine 17 of an exhaust gas turbocharger 18, which comprises not only the exhaust gas turbine 17 but also, in the conventional manner, an compressor 19. This second exhaust gas stream 14, drawn off from the exhaust gas stream 4 upstream of the exhaust gas turbine 17, flows, via a throttle flap 13 and an injection nozzle 11, which injects the fuel 12, to the HC oxidation catalyst 8, where again the exothermic reaction or oxidation takes place; that is, a heated second exhaust gas stream 14 is made available.

The throttle valve could also be arranged downstream of the feed point of the hydrocarbons. This is shown by way of example in FIG. 2, in which another throttle flap 20 is installed downstream of the HC oxidation catalyst 8 in the area of the entry point of the bypass line 7 into the exhaust gas line 5'. This throttle flap 20 can be installed in addition to the throttle flap 13 or in place of it. The throttle flap 20 shown here acts together with the throttle flap 13; they can therefore supplement each other depending on the selected parameters and can also provide, for example, a known waste gate function to protect the turbocharger and/or the engine from damage.

Downstream of the exhaust gas turbine 17, the remaining first exhaust gas stream 15 flows, in a manner similar to that previously described, through the NO oxidation catalyst 6, where the NO is oxidized to $NO_2$, so that afterwards the $NO_2$-loaded first exhaust gas stream 15 can be mixed with the hot second exhaust gas stream 14 downstream of the NO oxidation catalyst 6 and downstream of the HC oxidation catalyst 8, and a hot, $NO_2$-loaded exhaust gas stream 16 can be conducted to the particle filter 3. The function and effect of the regeneration device 1 of FIG. 2 are the same as those described and explained previously in conjunction with FIG. 1. To this extent, reference is made to the discussion above.

In the embodiment of FIG. 2, purely by way of example and shown in schematic fashion, an $NO_x$ reduction catalyst 22, formed, for example, by an $NO_x$ storage catalyst or by an SCR catalyst, is installed downstream of the particle filter 3, by means of which the exhaust gas stream 23 leaving the particle filter 3 can be subjected to an NO$_x$ reduction treatment.

Figure 3:
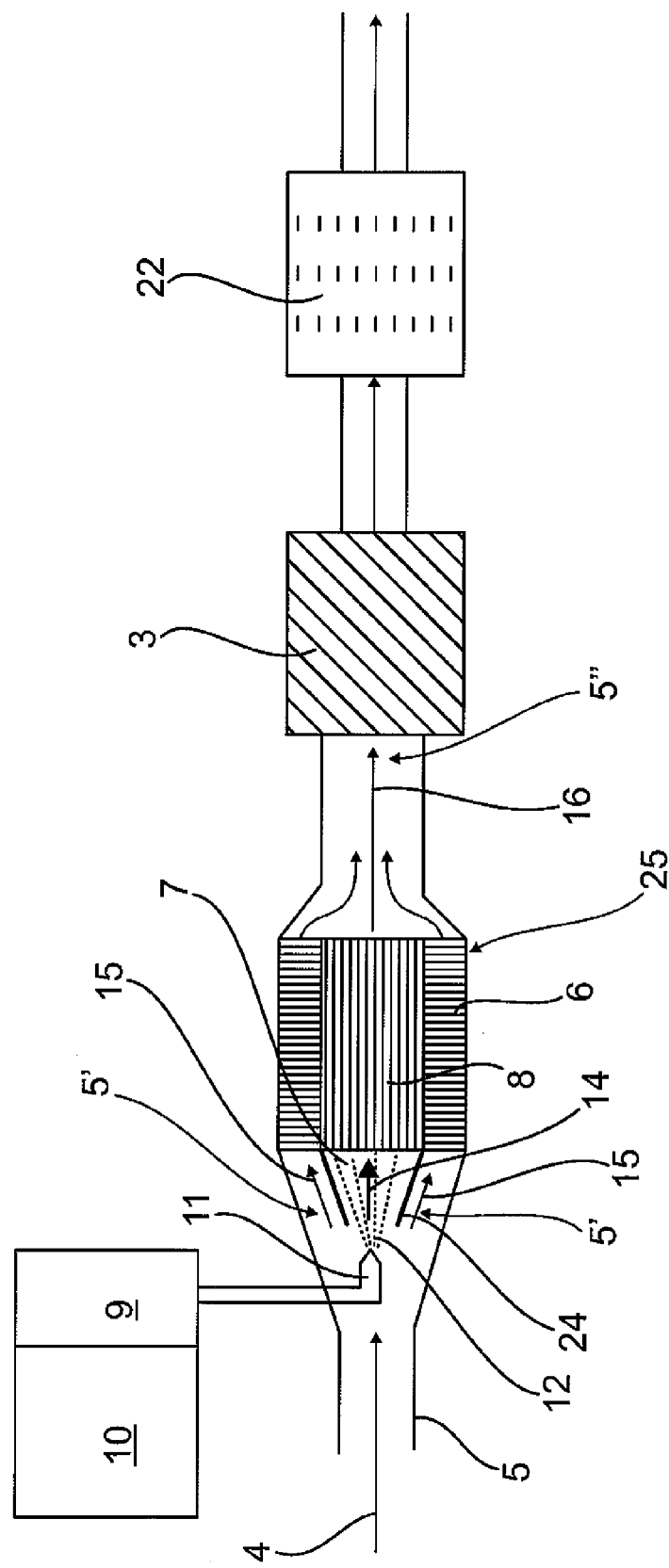
FIG. 3 is a schematic diagram of a device for the regeneration of a particle filter installed in the exhaust gas tract according to a third embodiment.

FIG. 3 shows schematically and by way of example a third embodiment of a regeneration device 1, in which, to obtain an especially compact and thus space-saving design, the HC oxidation catalyst 8 is arranged and accommodated inside an NO oxidation catalyst 6, which surrounds the HC oxidation catalyst 8 in ring-like fashion. The exhaust gas stream 4 flowing via the exhaust gas line 5 to the two catalysts 6, 8 is divided here by one or more flow guide elements 24 into a first exhaust gas stream 15, which flows only through the NO oxidation catalyst 6, and a second exhaust gas stream 14, which flows only through the HC oxidation catalyst 8. The mass of the second exhaust gas stream 14 flowing through the HC oxidation catalyst 8 is determined by the geometry of the flow guide elements 24 and/or by the throttle elements and/or shut-off elements formed as integral parts of the flow guide elements or are provided additionally to them. Thus, for example, the feed opening to the HC oxidation catalyst 8 can be closed or opened to a greater or lesser extent by a flap or by a valve as a shut-off element, wherein the actuation of the flap or of the valve can be accomplished by way of an electronic open-loop and/or closed-loop control device as a function of predetermined operating parameters, in a manner similar to the actuation of the throttle flaps 13 and 20 previously described in conjunction with the embodiments according to FIGS. 1 and 2.

An injection nozzle 11 of a metering device 9, by means of which fuel 12 can be injected into the second exhaust gas stream 14, is again provided; here it is arranged directly upstream of the entry area of the flow guide elements 24, so that an exothermic reaction takes place in the HG oxidation catalyst 8 and the hot exhaust gas stream leaving the HC oxidation catalyst 8 can be mixed with the first exhaust gas stream 15 flowing through the NO oxidation catalyst 6 to form a hot, NO$_2$-loaded exhaust gas stream 16. This hot, NO$_2$-loaded exhaust gas stream 16 then flows through the particle filter 3 and through an NO$_x$ reduction catalyst 22, as previously described in conjunction with FIG. 2.

In a manner similar to that of the embodiments according to FIGS. 1 and 2, the flow areas formed by the flow guide elements 24 form branch lines 5' and 7, which branch from the exhaust gas line 5 and are then brought back together again in the area downstream of the NO oxidation catalyst 6 and downstream of the HC oxidation catalyst 8 to form a common exhaust gas line 5".

As can also be derived from the schematic diagram of FIG. 3, the NO oxidation catalyst 6 and the HC oxidation catalyst 8 are arranged preferably here in a common housing 25.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for the regeneration of a particle filter arranged in the exhaust gas tract of an internal combustion engine, the method comprising:
    dividing an exhaust gas flow exiting the internal combustion engine into a first and a second exhaust gas stream;
    oxidizing the first exhaust gas stream by an oxidation catalyst configured for the oxidation of at least NO to NO$_2$, the oxidation catalyst arranged in a first exhaust gas line upstream of the particle filter and through which the first exhaust gas stream flows;
    heating the second exhaust gas stream in a second exhaust gas line by at least one heater, configured as a heating catalyst to heat the second exhaust gas stream upstream of the particle filter, said first and second exhaust gas lines being parallel to each other;
    thereafter mixing the heated second exhaust gas stream with the first exhaust gas stream loaded with NO$_2$ coming from the NO oxidation catalyst, said mixing being performed upstream of the particle filter;
    metering at predetermined times in predetermined quantities hydrocarbons into the second exhaust gas stream upstream of the at least one heater by a metering device;
    oxidizing the hydrocarbons; and
    supplying a predetermined amount of a charging-air stream to the second exhaust gas stream upstream of the heater during at least one of predetermined times, when an exhaust gas temperature exceeds a certain value, when lambda falls below a predetermined value, and when the oxygen falls below a predetermined value.

2. The method according to claim 1, wherein the second exhaust gas stream is at least one of:
    branched off from a charging air line; and
    branched off from an exhaust gas stream of the internal combustion engine forming the second exhaust gas stream.

3. The method according to one of claim 2, wherein an exhaust gas mass of the first exhaust gas stream is larger than an exhaust gas mass of the second exhaust gas stream, wherein the exhaust gas masses of the first and second exhaust gas streams are controlled by at least one throttle device and at least one shut-off device actuatable by at least one of an open-loop control device and a closed-loop control device.

4. The method according to claims 2, wherein the second exhaust gas stream is taken from a point located upstream of at least one exhaust gas turbocharger.

5. The method according to claim 3, wherein at least one of a throttle device and a shut-off device is arranged in the area of an exhaust gas line for conducting the second exhaust gas stream and is configured as a waste gate.

6. A device for the regeneration of a particle filter arranged in the exhaust gas tract of an internal combustion engine comprising:
    an exhaust gas line for conducting exhaust gas from the internal combustion engine, said exhaust gas line splitting into a first branch line for carrying a first exhaust gas stream and a second branch line for carrying a second exhaust gas stream;
    at least one NO oxidation catalyst disposed in said first branch line and configured for the oxidation of NO, arranged upstream of the particle filter and through which said first exhaust gas stream flows;
    at least one heater disposed in said second branch line and configured as a heating catalyst for oxidizing hydrocarbons arranged upstream of the particle filter and through which said second gas stream flows, said first and second branch line merging downstream of said NO oxidation catalyst and said heater so that said first gas stream and said second exhaust gas stream are supplied in a mixed state downstream of the NO oxidation catalyst and the heater to the particle filter;

a metering device for metering at predetermined times in predetermined quantities hydrocarbons into the second exhaust gas stream upstream of the at least one heater; and a device for supplying a predetermined amount of a charging-air stream to the second exhaust gas stream upstream of the heater during at least one of predetermined times, when an exhaust gas temperature exceeds a certain value, when lambda falls below a predetermined value, and when the oxygen falls below a predetermined value.

7. The device according to claim 6, wherein said second gas stream is an exhaust gas stream of the internal combustion engine.

8. The device according to claim 6, wherein the second branch line is configured as a bypass line that branches off from the exhaust gas line that simultaneously forms the first branch line and leads to the NO oxidation catalyst.

9. The device according to claim 6, wherein the heater is formed by a heating catalyst configured as an HC oxidation catalyst.

10. The device according to claim 9, further comprising a metering device configured to meter a reducing agent into the additional gas stream for an exothermic reaction upstream of the heating catalyst.

11. The device according to claim 9, wherein the exhaust gas line conducting the additional exhaust gas stream is fluidically connected to a fresh-air line that can be shut off by a shut-off device and at least one of a charging air-side fresh-air stream and a charging-air stream branched off downstream of the entry point of an exhaust gas return line is input into a charging-air line supplied to the exhaust gas line conducting the additional exhaust gas stream.

12. The device according to one of claim 6, wherein the at least one heater configured as a heating catalyst is arranged in the exhaust gas tract such that at least one exhaust gas stream flows around certain areas of the at least one heater.

13. The device according to claim 6, further comprising:

at least one control device configured to adjust the mass of the exhaust gas stream and the second exhaust gas stream;

the at least one control device actuating at least one of a throttle device and a shut-off device, based at least in part on at least one of a predetermined quantitative and a mass-flow parameters, wherein the at least one throttle device and the shut-off device is arranged in at least one of the first and the second branch lines.

14. The device according to claim 6, wherein the second exhaust gas stream is branched off upstream of an exhaust gas turbine of an exhaust gas turbocharger.

15. The device according to claim 14, wherein at least one of a throttle device and the shut-off device arranged in the area of the exhaust gas line conducting the additional exhaust gas stream is configured as a waste gate.

* * * * *